No. 872,546. PATENTED DEC. 3, 1907.
J. STICKLEY.
HARROW ATTACHMENT.
APPLICATION FILED AUG. 23, 1907.
2 SHEETS—SHEET 1.
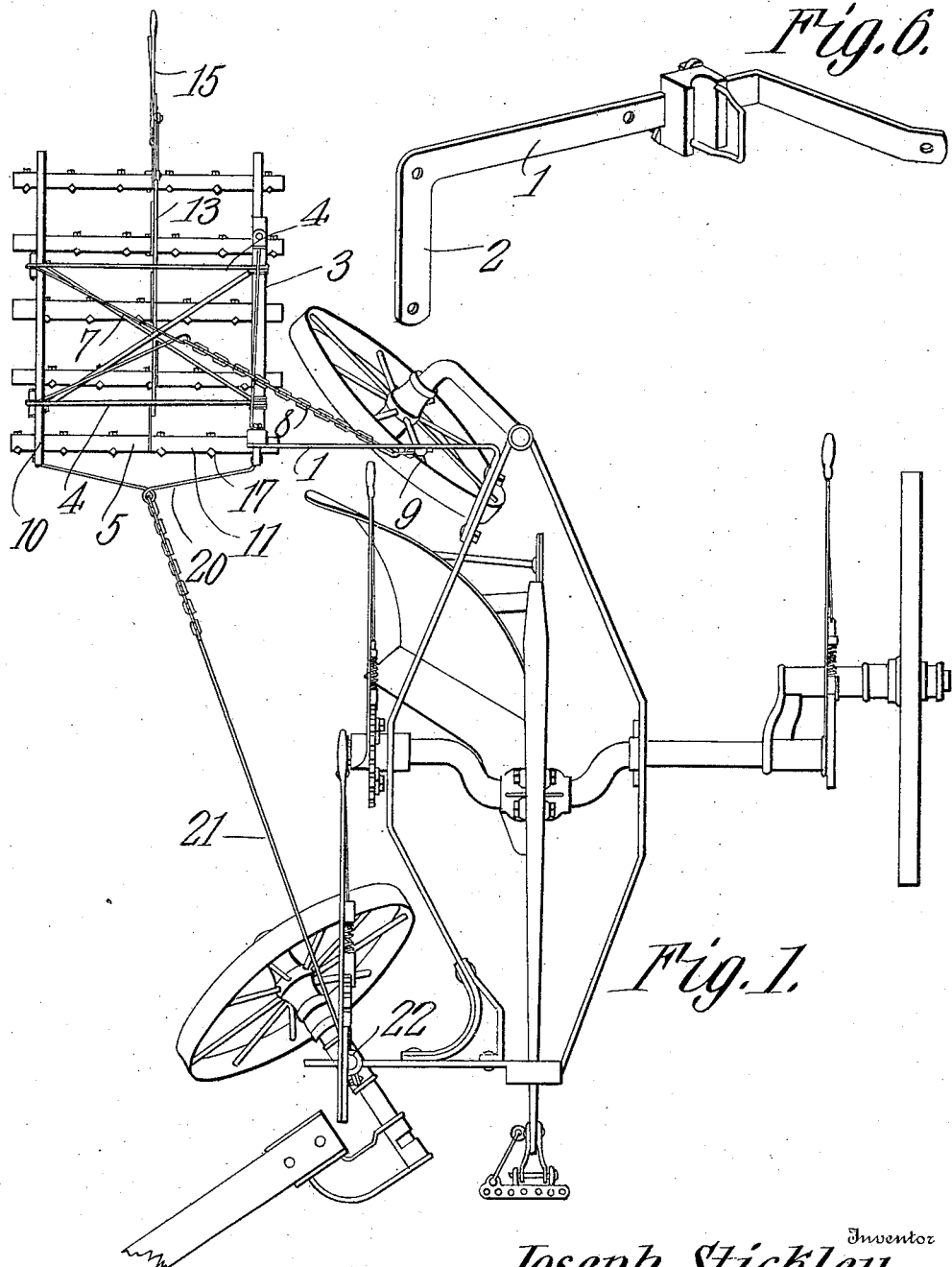
Inventor
Joseph Stickley.
Witnesses
By C. A. Snow & Co.
Attorneys No. 872,546.  
PATENTED DEC. 3, 1907.  
J. STICKLEY.  
HARROW ATTACHMENT.  
APPLICATION FILED AUG. 23, 1907.
2 SHEETS—SHEET 2.
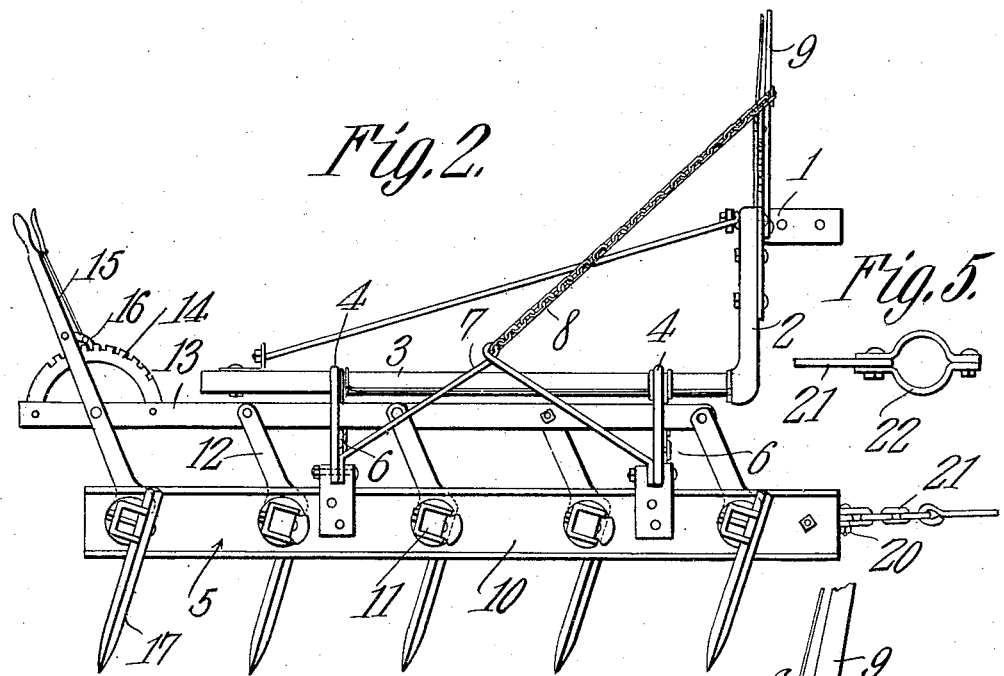
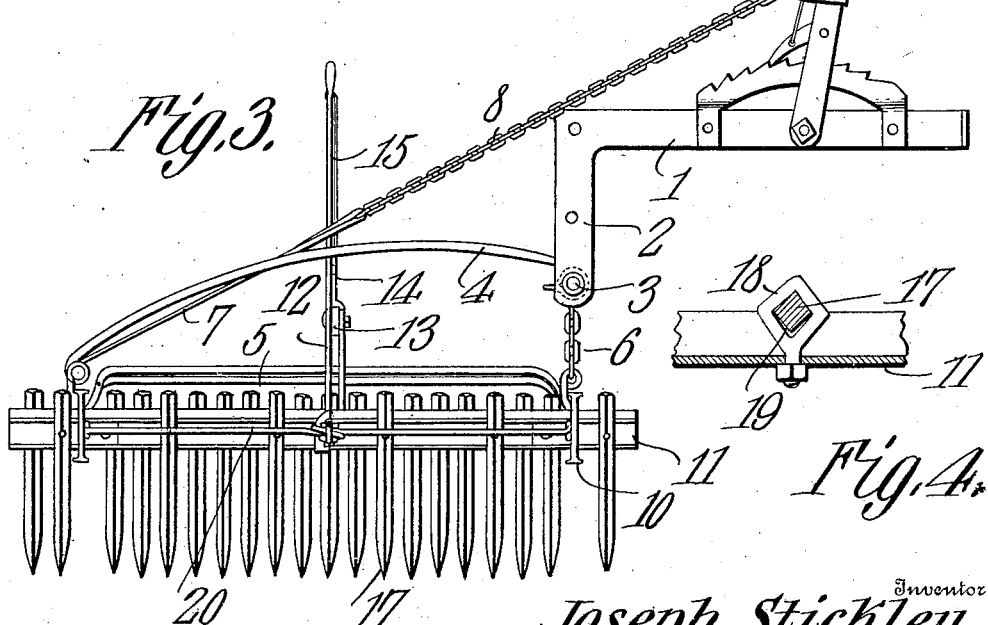
Inventor  
Joseph Stickley.
Witnesses
By C. A. Snow & Co.  
Attorneys

UNITED STATES PATENT OFFICE.

JOSEPH STICKLEY, OF LAKE ANDES, SOUTH DAKOTA.

HARROW ATTACHMENT.

No. 872,546.          Specification of Letters Patent.          Patented Dec. 3, 1907.

Application filed August 23, 1907. Serial No. 389,899.

*To all whom it may concern:*

Be it known that I, JOSEPH STICKLEY, a citizen of the United States, residing at Lake Andes, in the county of Charles Mix and State of South Dakota, have invented a new and useful Harrow Attachment, of which the following is a specification.

This invention has relation to harrow attachments for plows and it consists in the novel construction and arrangement of its parts as hereinafter shown and described.

The object of the invention is to provide an attachment which may be connected up with plows of the sulky type and which is adapted to operate upon the furrow just after it is turned and which is also adapted to operate upon the next adjacent furrow whereby in the course of plowing the field it will be harrowed twice, which operations thoroughly pulverize the soil and place the same in condition for planting.

The attachment consists primarily of a frame which is adapted to be attached to the frame of a plow by means of an arm pivotally connected to the frame. A lever mechanism is mounted upon the arm and is connected by means of a chain or its equivalent with the frame, whereby, the said frame may be raised or lowered at will. A harrow member is located under the frame and is connected with the same and a tow rod or chain connects the said harrow member with the frame of the plow. By this arrangement the harrow member is drawn substantially in the line of draft of the other plow, while the frame which is supported by the frame of the plow guides the harrow member.

In the accompanying drawings:—Figure 1 is a top plan view of the attachment applied to a plow. Fig. 2 is a side elevation of the attachment. Fig. 3 is a front elevation of the attachment. Fig. 4 is a detailed sectional view of a portion of one of the harrow bars. Fig. 5 is a plan view of a means for attaching the tow-chain of the attachment to the head block of the plow, and Fig. 6 is a perspective view of a modified form of arm for connecting the attachment with the tail block of the plow.

The attachment consists of the arm 1 which is attached at one end to the frame of the plow. Said arm is provided with a depending portion 2 from which the shaft 3 extends rearwardly. The cross bars 4 are journaled upon the shaft 3 at one end and their opposite ends are pivotally connected with the outer side of the harrow member 5. The chains 6 connect the inner side of the harrow member with the shaft 3. The bail 7 is pivotally attached to the outer side of the harrow member 5 and the chain 8 connects the said bail with the ratchet lever 9 mounted upon the arm 1. The harrow member 5 consists of the side beams 10 in which are journaled the cross bars 11. Each cross bar is provided at an intermediate point with an arm 12 and the arms 12 are connected together by a rod 13. Said rod is provided with a gear segment 14. A lever 15 is mounted upon one of the cross bars 11 and is provided with a spring actuated pawl 16 adapted to engage the gear segment 14. Thus as the lever 15 is swung the cross bars 11 are simultaneously turned and the bars are held in adjusted positions by means of the lever 15 and gear segment 14. The bars 11 are preferably formed or cut from channel iron and the harrow teeth 17 are attached thereto by means of eyebolts 18, the flanges of the bars being notched as at 19 to receive the side portions of the teeth 17. The teeth on the successive bars are arranged diagonally with relation to the line of draft and are at such relative distances apart as to operate upon the entire surface of the ground as the attachment moves over the same. The forward ends of the beams 10 are connected together by a bail 20 to which is attached a draft chain or rod or combination of both 21 having at its forward end a collar 22 which is adapted to be attached to a portion of the frame of the plow.

From the foregoing description it is obvious that the harrow member 5 is drawn behind the plow by the chain or rod 21 and that the cross bars 11 constitute a guiding frame for directing the harrow member in its proper course with relation to the plow. The lever mechanism 9 and its connections afford means for raising or lowering the harrow member while the lever mechanism 15 and its connections affords means for adjusting the pitch or angle at which the teeth 17 shall operate upon the ground. By such an attachment the soil is harrowed immediately after it is turned and consequently is not subjected to the atmosphere sufficiently long to form into clods or lumps but is operated upon by the harrow while in a mellow condition.

Having described my invention what I claim as new and desire to secure by Letters-Patent is:—

1. A harrow attachment comprising an arm carrying a shaft and a ratchet lever, a frame journaled to the shaft, a harrow located under the frame and being pivotally connected thereto at one side, chains connecting the opposite side of the harrow with the shaft, a chain connecting the harrow with the ratchet lever and a draft means attached to the harrow member.

2. A harrow attachment comprising an arm having a shaft and a ratchet lever, a frame journaled to said shaft, a harrow member located under the frame and being pivotally connected thereto at one side, chains connecting the opposite side of the harrow member with the shaft, a chain connecting the harrow member with said ratchet lever, said harrow member consisting of side beams, cross bars journaled in said beams and being connected together, a lever mechanism for turning the cross bars simultaneously and a draft means attached to the beams of the harrow member.

In testimony that I claim the foregoing as my own, I have hereto affixed my signature in the presence of two witnesses.

JOSEPH STICKLEY.

Witnesses:
 HOYLE GILREATH,
 C. D. GILREATH.